UNITED STATES PATENT OFFICE 2,307,158

ANTISKINNING AND WEATHER-RESISTING AGENTS FOR DRYING OIL COMPOSITIONS

Harold C. Reynolds, Jr., Elizabeth, and Henry B. Kellog, Union City, N. J., assignors to Standard Oil Development Company, a corporation of Delaware No Drawing. Application September 30, 1938, Serial No. 232,528

2 Claims. (Cl. 260—18)

The present invention relates to anti-skinning and anti-oxidizing agents in drying oils, paint and varnish compositions. More particularly, the invention relates to drying oil compositions and includes as its object the addition thereto of aliphatic, aromatic and aralykyl phosphites which possess the characteristic property of retarding the premature oxidation of drying oils, paints, varnishes, enamels and the like. Furthermore, these organic phosphites possess the additional characteristic property of interrupting the continued oxidation of drying oils, paints, enamels, varnishes and the like after said products have reached the desired oxidized condition, thereby increasing their durability.

In the manufacture of paints and varnishes, including the incorporation of drying oils therein, it is customary to employ a suitable quantity of dryers, or siccative, which are oxidation catalysts, to speed up the normal drying rate of the oil so that the composition will dry hard within a reasonable time after it is spread on a surface in a thin film. This positive oxidation catalyst is commonly called a dryer. It is well known that dryers commonly employed induce various oxidation phenomena, some of which are necessary and desirable, and some of which are very objectionable. For instance, the formation of organic peroxides is one very objectionable form in which oxidation phenomena may assert itself, because peroxides, when formed, catalyze further oxidation.

The development of the quick drying coating compositions has been attended with difficulties connected with the tendency of these coating compositions to change consistency on storage and to gel and skin on standing in the closed container or when the container cover is removed and the container exposed to the air. When these quick drying varnishes, paints, or enamels are applied over surfaces, they also have the tendency, upon drying and after slight weathering action, to show cracks, roughness, brittleness, peeling and a general breakdown of the film structure. The breakdown of a drying oil film may be due to brittleness caused by oxidation products or to a peculiar gel structure which depends, probably, upon the manner of cooking the resin and drying oil if the drying oil composition is a varnish. If the oil-resin mixture is cooked for too long a period, the gel structure formed may be of a type which will not weather satisfactorily.

According to our present invention, these undesirable qualities, such as skinning, gelling, and subsequent oxidation, are eliminated and films of greater durability are obtained by adding into paints, varnishes, oils and the like a small quantity of a preferred class of oxidation inhibitors comprising aliphatic and aromatic phosphites. Our studies made during the development of our invention have led us to the conclusion that all esters of phosphorous acid are useful as preventatives for the skinning or some formations on the surface of a packaged coating composition. However, the phosphites for which we have a preference comprise aliphatic esters of phosphorous acid, such as mono-, di- and tributyl, octyl and lauryl phosphite; aromatic esters such as mono-, di- and tri-phenyl phosphites; alkylated aromatic esters such as mono-, di- and tri-p-cresyl phosphite, p-ter-amyl phenyl phosphite, di-p-tertiary butyl monophenyl phosphite, di-phenyl mono-o-xenyl phosphite, di-o-xenyl mono-phenyl phosphite, tri-p-tertiary butyl phenyl phosphite and aralykyl esters such as mono-, di- and tri-benzyl phosphites.

The aliphatic and aromatic nucleus of these phosphites may also contain hydroxy and/or isocyanate groupings.

In the course of our experiments of evaluating the skinning properties of these phosphites, it was deemed desirable to select as a standard for comparison the most effective commercially available anti-skinning agents. Guiacol, which is one of the most efficient found on the market, can be purchased in various grades, all of which appear to be of about the same degree of efficiency, and was chosen as a standard of comparison. These guiacol products have a rather disagreeable odor. For this reason only small quantities can be used (quantities greater than 1.0% cannot be employed without sacrificing rapid drying when added to quick drying varnishes). Lower percentages, such as 0.1%, only inhibit the skinning for 19 days.

Pyrocatechol is also a very powerful anti-skinning agent, as low as 0.1% appeared to prevent skinning to the same degree as ten times the amount of guiacol. However, amounts of pyrocatechol greater than 0.1% interfere with rapid drying. Its odor is rather pronounced and unpleasant and somewhat analogous to guiacol. Its principal drawback is its darkening effect when mixed with varnishes.

As a specific example of an embodiment of our invention, a varnish which had a pronounced tendency to skin was prepared according to the following formula:

Varnish formula

Modified phenolic resin_____lbs__ 100
China-wood oil_____gal__ 30
Petroleum thinner_____gal__ 50
Dryers equivalent to 0.4% lead
0.03% manganese and 0.01% cobalt based on the weight of drying oil

Procedure

The oil and 75 pounds of the resin were heated to 550° F. for thirty minutes. The balance of the resin was added and the varnish cooled to 450° F. and thinned with the mineral spirits. When the thinned varnish reached room temperature, 5.5 lbs. of mixed dryers were added thereto. The material thus obtained was a very rapid drying varnish which contained substantially 51% of non-volatile matter, and when flowed on a clean wooden panel, dried hard to touch in 3½ hours.

To one hundred gram portions of the finished varnish prepared in the manner described above, 0.2% of tri-p-cresyl phosphite based on the non-volatile content of the varnish was added. Small vials were filled about half full with these treated varnish portions, using 2 vials (2 oz. and 4 oz.) for each test. Samples of the untreated varnish were likewise included for comparison. The vials were stoppered and examined for skinning at regular intervals. To those samples, both treated and untreated, which did not skin at the end of four days, a fresh supply of air was admitted. A skin was considered to have formed when it had sufficient strength to support the varnish when the vials were inverted. This type of accelerated test is equivalent to several weeks or months for varnishes packed in cans with the usual small air space which is allowed, provided the cans are not opened until the contents are to be used. At the end of 4 days the non-inhibited varnish in both the 2 oz. and 4 oz. bottles formed a skin. After 220 days the inhibited varnish did not form a skin in either the 2 oz. or the 4 oz. bottles.

The inhibited varnish samples were flowed over a clean wooden panel. Samples of the untreated varnish were also flowed over in the same manner on identical panels for purposes of comparison. The dried panels of the treated and untreated varnish were exposed in a weather-o-meter for a period of 76 cycles (equivalent to about 11 weeks). The cycle used in this artificial weathering apparatus consists of the following weather conditions every 24 hours, which is taken as a cycle:

| | Hours |
|---|---|
| Rain | 1 |
| Light | 2 |
| Rain | 2 |
| Light | 18 |
| Blank | 1 |
| Total | 24 |

After 76 cycles in the weather-o-meter the panels coated with the uninhibited varnish showed cracks, roughness, peeling, brittleness and other usual undesirable weathering characteristics, whereas the panels coated with the inhibited varnish did not exhibit any of the undesirable characteristics but showed a marked improvement in the film durability, thus indicating that the inhibitors counteracted the undesirable oxidation effects in the latter stages of the drying process, thereby increasing the varnish film durability and counteracting the wrinkle formation by retarding superficial oxidation.

The anti-skinning agents of our invention may be employed in practically any type of drying oil composition, such as paints, enamels, varnishes and varnishes containing alkyd resins, etc., as well as in the drying oils used in their manufacture. When used as oxidation inhibitors in drying oils, the quantity may be from 0.01% to 0.5%. Their action in drying oils is to inhibit the action of gaseous oxygen when confined in containers, and to interrupt the induction period (superficial peroxide formation) until the normal oxidation rate has progressed to the desirable stage of drying, and retarding subsequent oxidation thus extending the life of the film.

These anti-skinning agents mix readily with oleoresinous varnishes, and also act as gelation inhibitors in tung oil varnish cooking. They mix readily in paints, enamels, etc. They do not increase the viscosity or give any false body. Their added advantages are their light color and mild odor, thus preventing the darkening or coloring of light straw colored varnishes. They do not react between dryers such as lead, cobalt and manganese in that they act as neutral bodies in varnishes, enamels and the like.

While we have disclosed the preferred embodiments of our invention, it will be readily apparent to those skilled in the art that many changes and variations may be made therein without departing from the spirit of our invention.

We claim:

1. In coating compositions containing a drying oil, a positive oxidation catalyst and a negative oxidation catalyst, the method of improving the storage stability of a coating composition and the weather resistance of the dried coat, comprising adding to the finished composition of the other components a small amount of tri-p-cresyl phosphite as negative oxidation catalyst.

2. A coating composition containing tung oil, a phenol resin, a positive oxidation catalyst and a negative oxidation catalyst, obtained by adding as negative oxidation catalyst 0.01 to 0.5% of tri-p-cresyl phosphite to the finished composition of the other components.

HAROLD C. REYNOLDS, Jr.
HENRY B. KELLOG.